(12) United States Patent
Jarp et al.

(10) Patent No.: US 7,085,989 B2
(45) Date of Patent: Aug. 1, 2006

(54) OPTIMIZED TESTING OF BIT FIELDS

(75) Inventors: Sverre Jarp, Cheserex (CH); Dale Morris, Steamboat Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 500 days.

(21) Appl. No.: 10/414,705

(22) Filed: Apr. 15, 2003

(65) Prior Publication Data

US 2004/0210811 A1    Oct. 21, 2004

(51) Int. Cl.
*H03M 13/00*    (2006.01)

(52) U.S. Cl. .......................... 714/776; 714/763; 714/3

(58) Field of Classification Search ................ 714/776, 714/763, 742, 743, 703, 30, 38, 724, 3, 52
See application file for complete search history.

(56) References Cited

U.S. PATENT DOCUMENTS

| | | | |
|---|---|---|---|
| 5,268,995 A * | 12/1993 | Diefendorff et al. | 345/422 |
| 6,300,770 B1 * | 10/2001 | Watkins et al. | 324/537 |
| 6,594,317 B1 * | 7/2003 | Gorday et al. | 375/259 |
| 6,658,002 B1 * | 12/2003 | Ross et al. | 370/392 |
| 6,760,837 B1 * | 7/2004 | Laurenti et al. | 712/300 |
| 2004/0153913 A1 * | 8/2004 | Fishman et al. | 714/724 |

* cited by examiner

*Primary Examiner*—Albert DeCady
*Assistant Examiner*—Fritz Alphonse

(57) ABSTRACT

A method for comparing bit field contents for bit fields comprising less than a full complement of the source is provided. The method includes creating a mask covering the bit field in the source, setting bit positions within the mask that are outside the bit field in the source to predetermined values, combining the source against the mask to form an intermediate result, and comparing bits in the intermediate result to provide a final result. Alternately, the method may form a mask, combining the bit field with a comparison value to form an intermediate value, and perform a combined function using the mask to select bits from the intermediate value, or fixed zero or one values, and comparing this result with zero.

24 Claims, 5 Drawing Sheets

```
dep.z rmask = -1, pos6, len6   // create a mask having all 1s over the bit field
;;
and rresult = rsource, rmask   // mask off bits outside the field
;;
cmp.eq  p1, p2 = 0, rresult   // compare to zero
```

FIG. 4
PRIOR ART

```
dep.z rmask = -1, pos6, len6   // create a mask having all 1s over the bit field
;;
andcm  rmask = -1, rmask   // create the ones complement of the mask
;;
or rresult = rsource, rmask   // force bits outside of field to 1
;;
cmp.eq  p1, p2 = -1, rresult   // compare to all 1s
```

FIG. 5
PRIOR ART

```
dep.z rmask = -1, pos6, len6  // create a mask having all 1s over the bit field
;;
cmpmask.z p1, p2 = rsource, rmask  // p1 = ((rsource & rmask)==0)
```

*FIG. 6*

```
dep.z rmask = -1, pos6, len6  // create a mask having all 1s over the bit field
;;
cmpmask.nz  p1, p2 = rsource, rmask  // p1 - ((rsource |~rmask)==-1)
```

*FIG. 7*

OPTIMIZED TESTING OF BIT FIELDS

BACKGROUND OF THE INVENTION

1. Field of the Invention

The present invention relates generally to the field of computing, and more specifically to testing or comparing bit fields in high speed computer environments.

2. Description of the Related Art

Certain newer computing devices employ high speed architectures having highly efficient execution and fast throughput. One such high speed computing architecture is the Itanium architecture, a joint development between Intel Corporation of Santa Clara, Calif. and Hewlett Packard Corporation of Palo Alto, Calif., the assignee of the present invention. The Itanium architecture employs EPIC (Explicitly Parallel Instruction Computing), a technology enabling enhanced performance over previously known RISC architectures. Features and a general discussion of the Itanium 2 processor can be found at:

http://h21007.www2.hp.com/dspp/files/unprotected/litanium2.pdf

The Itanium architecture conforms to various Itanium architecture developer's guides, user manuals, reference guides, and related publications, including but not limited to Intel Order Numbers 245317-004, 245318-004, 245319-004, 245320-003, 249634-002, 250945-001, 249720-007, 251141-004, 248701-002, 251109-001, 245473-003, and 251110-001.

A conceptual arrangement of a system employing Itanium architecture is illustrated in FIG. 1. As used herein, the Itanium architecture may be embodied in different implementations, including but not limited to the Itanium processor and Itanium 2 processor. From FIG. 1, processor 102 resides in computing apparatus 101. Processor 102 employs a series of registers within certain register files, such as general register file 110. The system further includes a compiler 114 that compiles code and facilitates the execution of compiled computer code to interact with and between the aforementioned registers and register files.

Code employed in high speed architectures performs various computing tasks, such as comparisons. Comparisons typically involve comparing two register values to see if some relationship is true, such as one value being equal to the other, one being less than the other, and so forth.

Frequently, data values being compared are not as large as the registers holding them. Two specific situations exist when comparing values that do not occupy the entire register. First, the register may hold only the small value, typically in the lower order bits of the register. Bits above the value or in the higher order portion of the register may be either all zeros, all ones, all a copy of the most significant bit of the value (sign extended), or all irrelevant or "garbage" values. In this scenario, comparisons are typically performed by using special compare instructions that compare only a subset of the total number of bits, and such comparisons are typically restricted to certain bit field sizes. Examples of size restricted comparison instructions include compare-byte and compare-halfword instructions.

Alternately, comparisons may be performed by executing an instruction to convert the smaller value to equivalent larger sized values and using a full register size comparison. The system may convert to larger sized values by sign extending signed values, as with a sign-extend-byte instruction, or by zero extending unsigned values, as with a zero-extend-byte instruction. In these situations, a conversion or possibly a shift instruction may be required prior to performing a comparison. In cases where upper bits are known to be the desired values (all zeros, or copies of the signed bit, depending on whether the value compared is unsigned or signed), the conversion instruction may be omitted.

Secondly, the situation may arise where the register holds multiple values packed together and the value to be compared lies at an arbitrary point within the register. This scenario can occur where the original source program orders certain data to be packed into bit fields. While data packing tends to decrease the efficiency of operating on the data within a processor, it also tends to decrease the total amount of memory needed. The result is an increase in the efficiency of memory usage, cache usage, and so forth. In the presence of a significant amount of such data, increased memory and cache efficiency can be dominating factors, making packing data into bit fields particularly advantageous.

The comparing of values packed into bit fields typically operates as follows. The system extracts the value and places the extracted value in the low order bits of the register. The system compares the extracted value using normal full register compare instructions. Extraction is typically performed by shifting the value to the least-significant end of the register and masking the upper bits, such as by forcing them to zero if the value being extracted is unsigned. Alternately, the system may shift the value to the most significant end of the register, and subsequently shift the value down to the low end of the register. This shift-up, shift-down approach uses either a logical shift right to extract an unsigned field or an arithmetic shift right for extraction of a signed field. The arithmetic shift causes the system to shift a copy of the sign bit to the upper bit(s).

Another previous method employed to compare contents of a bit field containing less than a full complement of data is an extract instruction. An extract instruction performs a right shift together with a masking in a single instruction. This method fills upper bits of the register with either zeros, for an unsigned extract, or copies of the sign bit for a signed extract.

A further method addresses the situation where the bit field compared is a single bit, typically using a special instruction to test the bit against a one or a zero. One such implementation is included in the Itanium architecture as "tbit" or test bit. Generally, such an instruction is designed to use the same shifter or functional unit as employed by shift left and shift right instructions. In the single bit situation, the system shifts the value to the right so the bit to be tested is at the bottom of the result. The system then compares the shifted result against zero or one.

These approaches have been sub-optimal for various reasons. First, certain of these implementations require several instructions to extract, shift and/or convert the value into a full register value before performing a comparison. These instructions tend to be serially dependent, so little parallelism can be exploited by multiple functional units. Second, these comparisons typically require at least one instruction that must be performed by a shifter functional unit. Most modern processors tend to implement more arithmetic/logical functional units (ALUs) and fewer shifter units. The necessary extract, shift and/or convert operations must typically be performed in serial before the associated comparison, so again the opportunity to employ parallelism and perform multiple instructions or functions at one time is reduced. Finally, as shifter designs have significant amounts of execution time taken up by propagation of signals through wires rather than the time required to perform hardware switching, such as switching transistors, and because propagation time through wires does not scale as well as transistor speeds in the presence of ever-smaller integrated circuit geometries, shifter functional units tend to not scale nearly as well as ALUs. Poor scaling when propagating through wires tends to cause shift operations to need more processor clock cycles than ALU operations in newer and currently contemplated future designs. Requiring shift operations to perform bit field comparisons further increases the latency of such operations. Use of shift operations to perform bit field comparisons further decreases the amount of parallelism available in such sequences.

Further, as the size of the data working set for programs increases at a faster rate than the rate of increase of associated cache sizes, the incentive to increase the memory efficiency of the data working set, such as by packing data into data fields, increases as well. It would therefore be beneficial to perform bit field comparisons more efficiently, using fewer instructions and allowing greater parallelism. It would also be beneficial to offer comparisons with less dependency on shift operations. In sum, it would be advantageous to more efficiently perform bit field comparisons; including comparisons of a typically sized values in high speed processor architecture environments, such as the Itanium architecture, and minimize those drawbacks associated with previous bit field comparisons.

SUMMARY OF THE INVENTION

According to a first aspect of the present design, there is provided a method for testing bit field contents contained in a source, the source comprising a full complement of source bits, the bit field comprising less than the full complement of source bits and having a size and position within the source. The method comprises encoding the position and the size of the bit field into a reference field, creating a mask using the position and size in the reference field, combining the mask with the source to form a full width intermediate result, whereby for each bit in the full width intermediate result, the mask selects between bits from the source and desired bits, and combining all bits in the full width intermediate result to form a final result.

According to a second aspect of the present design, there is provided a method for testing bit field contents contained in a source, the source comprising a full complement of source bits, the bit field comprising less than the full complement of source bits. The method comprises creating a mask. The creating comprises setting bits in the mask positioned outside the bit field in the source to zero and setting bits in the mask positioned inside the bit field in the source to one. The method further comprises applying the mask created to the source to form an intermediate result, and combining bits in the intermediate result to form a final result.

According to a third aspect of the present design, there is provided a method for comparing bit field contents contained in a source comprising a full complement of source bits, the bit field comprising less than the full complement of source bits. The method comprises creating a mask covering the bit field in the source, generating a comparison value, the comparison value comprising values to be tested against, the comparison value aligned with the bit field in the source, exclusively ORing the bit field with the comparison value to form an intermediate value having an intermediate bit field corresponding to the bit field in the source, and performing a combined function, the combined function applying the mask to the intermediate value to determine whether bits in the intermediate value corresponding to the masked bit field produce a uniform result.

According to a fourth aspect of the present design, there is provided a method for comparing bit field contents contained in a source comprising a full complement of source bits, the bit field comprising less than the full complement of source bits. The method comprises creating a mask using the reference covering the bit field in the source, generating a comparison value, the comparison value comprising values to be tested against, the comparison value aligned with the bit field in the source, and performing a combined function, the combined function exclusively ORing the bit field with the comparison value to form an intermediate value, and ANDing the intermediate value with the mask to determine whether bits in the intermediate value corresponding to predetermined values in the mask are of a selected value.

These and other objects and advantages of all aspects of the present invention will become apparent to those skilled in the art after having read the following detailed disclosure of the preferred embodiments illustrated in the following drawings.

DESCRIPTION OF THE DRAWINGS

The present invention is illustrated by way of example, and not by way of limitation, in the figures of the accompanying drawings in which:

FIG. 4 presents previous code ascertaining whether a field in a register contains all zeros;

FIG. 5 is previous code ascertaining whether a field in a register contains all ones;

FIG. 6 illustrates code according to one aspect of the present invention for testing whether a bit field contains all zeros; and FIG. 7 is code according to one aspect of the present invention for testing whether a bit field contains all ones.

DETAILED DESCRIPTION OF THE INVENTION

The present invention provides a method for comparing bit field contents contained in a source, such as a source register, against a reference, where the source comprises a full complement of bits, and the bit field to be compared contains less than the full complement of bits, and possibly a single bit. The design entails modification and enhancement of certain existing timing paths, most notably the testbit or tbit timing path, or alternately the ALU compare path. The implementation involves altering the tbit or compare datapaths in order to decrease the time required to perform the comparison and increase parallelism in the comparison.

Use of the Testbits Instruction

The Itanium design employs two instructions, extract and tbit, where tbit is the "test bit" instruction. These instructions operate as follows. The extract function, extr, may take the following form(s):

| | | |
|---|---|---|
| (qp) extr r1 = r3, pos6, len6 | signed form | (1) |
| (qp) extr.u r1 = r3, pos6, len6 | unsigned form | (2) |

In Equations (1) and (2), the system extracts a field from general register (GR) r3, either zero extended or sign extended, and places the field right-justified in GR r1. The field begins at the bit position specified by the pos6 immediate value and extends len6 bits to the left. The extracted field is sign extended in the signed form or zero extended in the unsigned form. The sign is taken from the most significant bit of the extracted field. If the specified field extends beyond the most significant bit of GR r3, the sign is taken from the most significant bit of GR r3. The immediate value len6 can be any number in the range 1 to 64, and is encoded as len6-1 in the instruction. The immediate value pos6 can be any value in the range 0 to 63.

The tbit instruction may take the following form:

$$(qp)\ tbit.trel.ctype\ p1,\ p2=r3,\ pos6 \qquad (3)$$

The system selects the bit specified by the pos6 immediate value from GR r3. The selected bit forms a single bit result either complemented or not depending on the trel completer. This result is written to the two predicate register destinations p1 and p2. The system determines the way the result is written to the destinations based on the compare type specified by ctype. The trel completer values .nz and .z indicate non-zero and zero sense of the test. If the two predicate register destinations are the same (p1 and p2 specify the same predicate register), the instruction will take an Illegal Operation fault if the qualifying predicate is set.

Figure 1:
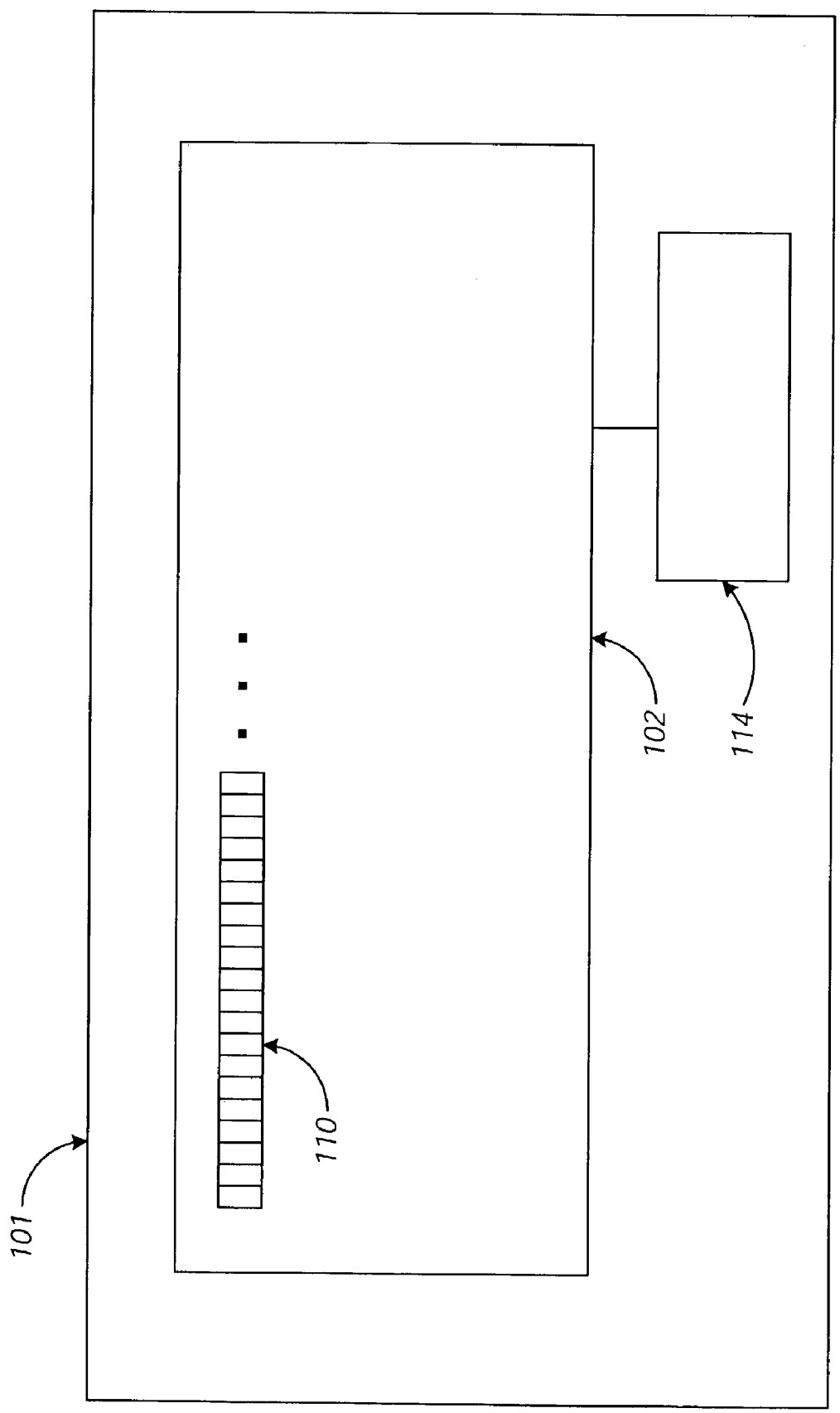
FIG. 1 is a functional block diagram of a processor in accordance with the design employed herein.
Figure 2:
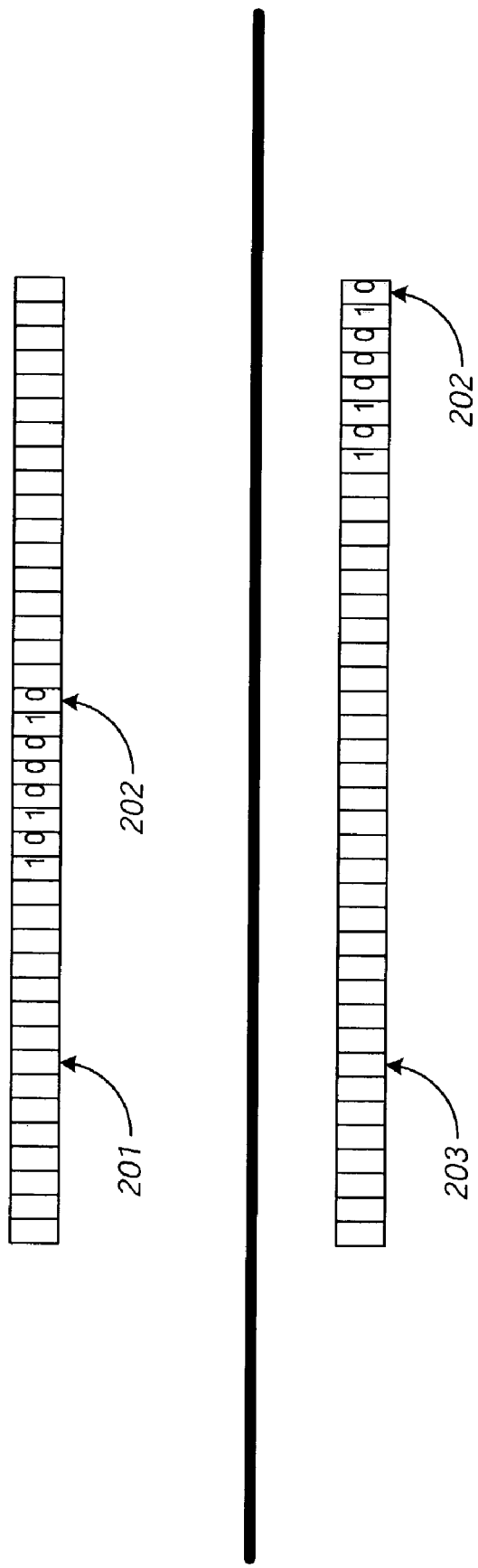
FIG. 2 is a diagram illustrating operation of the testbit (tbit) function.

A testbits instruction operates similar to the extract instruction. In the testbits instruction, the system shifts the input value to the right so that the field to be compared is in the least significant bits of the shifted result. A depiction of this shifting is presented in FIG. 2. From FIG. 2, the register 201 contains a sequence 202 that the system is to compare against a quantity. The sequence 202 is shifted right, to the least significant bits portion of the receiving set of wires 203 representing the output of the shifter.

The system then forms a bit mask in a similar manner to the bit mask formed in an extract function. The extract function in the Itanium design uses the len6 field in the instruction to create a 64 bit mask. The 64 bit mask drives a multiplexor for each of the 64 bits of the result, selecting either the shifted result within the bit field extracted, zero for extr.u or unsigned extract for bits above the extracted bit field, or the sign bit of the shifted result in the case of extr, or signed extract, for bits above the extracted bit field.

For the testbits instruction, the mask selects either the shifted result within the range of the bit field to be tested, or zeros or ones for the rest of the bits. If the system tests for a field having all ones, bit positions outside the shifted field are set to one, and the testbits instruction ANDs all 64 bits of this shift-and-mask result to produce the test or comparison result. If the system tests for a field being equal to zero, the bit positions outside the shifted field are set to zero and the testbits instruction performs an OR function on all 64 bits of the result to produce the test or comparison result. This additional 64 bit AND or 64 bit OR takes additional time to compute above and beyond the time required to compute tbit without the additional operation, but this added computational delay is relatively small.

In summary, this first approach provides a way to test a given bit field to see if the bitfield contains all zeros or all ones. The instruction encodes the position and size of the bit field to compare. The system computes the mask computed based on these two values. The system combines the mask with the shifted value to form a full-width intermediate result. For each bit position in this intermediate result, the mask selects either bits from the shifted source (bits in the bit field to be tested) or selects the value 0 or the value 1 (depending on whether testing is for all zeros or all ones, respectively). The system combines all bits in this intermediate result by ORing them all if looking for all zeros, or ANDing them all if looking for all ones, to form the comparison result.

An alternate approach avoids using the foregoing funnel shifting approach, instead routing the operand directly to the multiplexors driven by the mask. The mask may be generated in a similar manner to a mask generated in connection with the deposit command. The deposit command may take the following forms:

$$(qp)dep\ r1=r2,\ r3,\ pos6,\ len4$$

merge form, register form (4)

$$(qp)dep\ r1=imm1,\ r3,\ pos6,\ len6$$

merge form, immediate form (5)

$$(qp)dep.z\ r1=r2,\ pos6,\ len6$$

zero form register form (6)

$$(qp)dep.z\ r1=imm8,\ pos6,\ len6$$

zero form immediate form (7)

In the merge form, the Itanium system deposits a right justified bit field taken from the first source operand into the value in general register (GR) r3 at an arbitrary bit position and the result is placed in GR r1. In the register form, the first source operand is GR r2; and in the immediate form it is the sign-extended value specified by imm1 (either all ones or all zeroes). The deposited bit field begins at the bit position specified by the pos6 immediate and extends to the left (towards the most significant bit) a number of bits specified by the len4 immediate in the register form and by the len6 immediate in the immediate form.

In the zero form, the system deposits a right justified bit field taken from either the value in GR r2 (in the register form) or the sign extended value in imm8 (in the immediate form) into GR r1 and all other bits in GR r1 are cleared to zero. The deposited bit field begins at the bit position specified by the pos6 immediate and extends to the left (towards the most significant bit) a number of bits specified by the len6 immediate.

Figure 3:
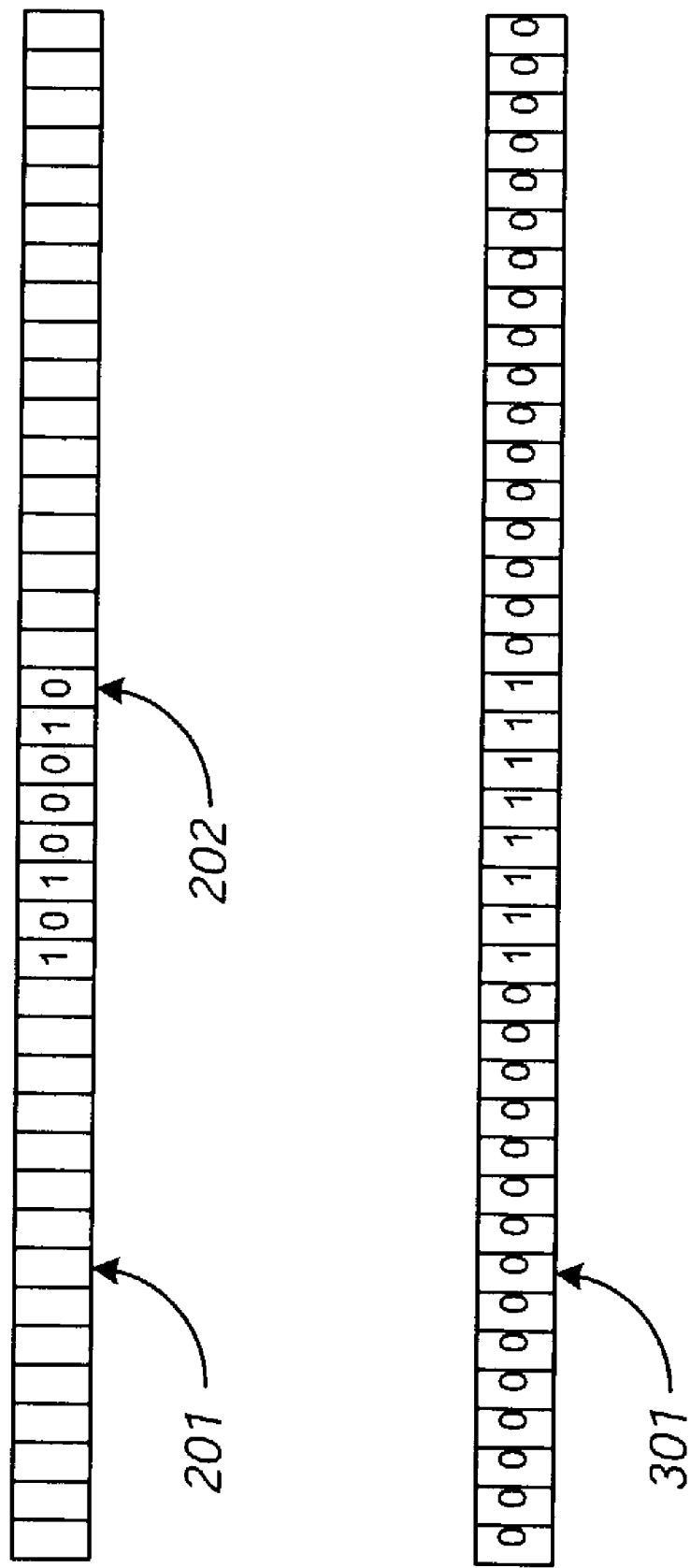
FIG. 3 illustrates a mask arrangement.

As when generating a mask for the deposit command, the present aspect of the design generates a field of ones corresponding to the bits within the source receiving the deposited value, i.e., covering the bit field to be compared, surrounded by zeros. Such a mask arrangement is shown in FIG. 3. The multiplexors then select either bits in the unshifted operand, or select zeros or ones, and as with the previous aspect, these values could all be reduced to a single bit result by ANDing across the 64 bits out of the multiplexors or ORing across the 64 bits. Such a methodology would keep the same instruction definition for tbit, but employs a physical implementation enabling functionality according to the foregoing description. In particular, masking entails setting ones in the selected field regions and zeros elsewhere, selecting bits using the multiplexor, followed by performing an AND or OR function across the selected bits. This locates the shifter outside the timing path used to compute the tbit result. Mask generation may be modified, potentially requiring additional time, and added time may also be required for the 64 bit AND/OR comparison following the multiplexor.

In summary, the system uses the mask to generate an intermediate result by selecting either bits from the source (for the bits in the bit field to be compared) or, for bits outside of the bit field to be compared, either zero if the system is comparing for all zeros or one if comparing for all ones. The system combines bits in the intermediate result by ORing them all if the bit field is to be compared against zero or ANDing them all if the bit field is to be compared against all ones in order to form the comparison result.

For both of the foregoing aspects, length may be encoded into the instruction. Encoding length into the instruction can require more space than previous implementations to obtain an increase in speed. Alternately, the testbits command may be restricted to certain enumerated compare types or other limitations may be imposed to efficiently carry out the compare.

Use of Compare Instructions

In the foregoing aspects of the present invention, computing the mask is the critical timing path necessary to provide improved bit field testing. The present aspect addresses the compare instruction as an alternative avenue to enhance timing performance. Previous implementations of the compare instruction in arithmetic/logical units operated as follows.

If the system sought to ascertain whether a particular field in a register contained all zeros, the system constructed a mask using dep.z, the deposit command in zero form. The system would then AND this mask with the source register and compare the result with zero. Such a construct is illustrated in FIG. 4. If the system sought to ascertain whether a field in a register contained all ones, the system could execute code such as that shown in FIG. 5. The present aspect addresses performing functionality equivalent to the instruction sets in FIGS. 4 and 5 with fewer instructions but using features present in typical compare circuits.

One notable characteristic in improving timing over the equations shown in FIGS. 4 and 5 is that an equality comparison can be performed more rapidly than a relational comparison, such as greater than, because no addition is required. If the system performs mask generation in a separate instruction from the comparison, the compare instruction having these semantics would not have any added timing path drawbacks. The new instruction, replacing the compare instruction, takes two register operands, combines the two operands bitwise using a logical function and compares the result to zero or minus one.

The new instruction, cmpmask, tests whether bits in a first source register corresponding to ones in a second mask source register are all ones or zeros. Testing a field for all zeros operates as shown in FIG. 6. Testing a field for all ones operates as shown in FIG. 7. For the coding shown in FIGS. 6 and 7, the system can test multiple discontiguous fields simultaneously with certain added instructions required for mask generation.

The system can further compare bit fields for equality to values other than all zeros or all ones. The foregoing cmpmask instruction provides the ability to accelerate comparison against a field containing nonstandard values. Previous systems have performed the following steps. First, the system generated a mask to mask out fields that the system was not to compare. Second, the system generated values to be tested against, called the "comparison value," and aligned bits in the comparison value with the bit fields to be compared against. Third, the system performed an exclusive OR (XOR) command of the received value with the comparison value. Fourth, the system would AND the result of the XOR of the received value with the mask value. Fifth and finally, the system would test the result for zero. The current cmpmask command performs both the AND and the test for zero in a single instruction.

In summary, the present aspect of the invention tests to see if the chosen bit field is equal to all zeros or all ones. The cmpmask instruction may test for arbitrary equality between a bit field and a comparison value. The system exclusively ORs (XORs) the source with the comparison value, which may cause the corresponding bit field in the result of the XOR to be all zeros if the bit field was equal to the comparison value. The system then uses cmpmask to check for whether this bit field in the XOR result is all zeros or not.

An alternate aspect of the present invention involves employing a mask as a special purpose register, thereby allowing a cmpmaskxor instruction that would do all three steps of XORing, masking and testing the result for zero while avoiding the need to have three register read ports into the general purpose register. The present aspect entails providing a special purpose mask register, and a cmpmaskxor instruction which is an altered version of the previous cmpmask command. Cmpmaskxor takes the first operand register, XORs the first operand register with the second operand register, and then ANDs the result with the special purpose mask register. Finally, the function tests to determine whether the result is zero.

In this aspect, mask generation may require an extra instruction to copy the mask into the special purpose mask register. However, multiple former functions are performed in a single function in this aspect.

The two aspects of the design involving the cmpmask or cmpmaskxor instructions requires additional opcode space to perform properly, but can remove timing path problems of performing an AND or OR reduction after a shift and mask operation.

The foregoing aspects enable more efficient comparisons of bit fields packed with other data into larger values. Parallelism and performance may be increased by those aspects of the design presented herein by reducing the total number of required instructions and reducing the number of shift operations needed. The foregoing may be used in association with the memcpy operation, where the memcpy operation copies a fixed sized block of non-overlapping memory using variables dest, for the destination, and src, for the source. The method disclosed herein may be further employed in a memcpy function to determine whether dest and src are aligned and the length is a multiple of eight. Using this design, the number of instructions and shift operations required to complete the memcpy operation may be reduced.

Another potential implementation of the design is in a routine that tests that the source is eight byte aligned, but not sixteen byte aligned, and at least one element to be compared is present. This implementation uses a command such as an ldf command, or load floating-point instruction command, followed by a series of ldfp commands in a loop. ldfp commands are floating-point load pair instructions. ldf commands may take various forms, including but not limited to the following:

(*qp*)*ldfsz.ld*type.*ldhint f*1 =[*r*3]

no base update form (7)

where the system reads a value consisting of fsz bytes from memory starting at the address specified by the value in GR r3. The system then converts the value into the floating-point register format and places the converted value in FR f1. The fldtype completer specifies special load operations, while the value of the ldhint modifier specifies the locality of the memory access. ldfp commands may also take various forms, including but not limited to the following:

(qp)ldfps.fldtype.ldhint f1, f2=[r3]

single form, no base update form (8)

The system reads eight or sixteen bytes from memory starting at the address specified by the value in GR r3. The value read is treated as a contiguous pair of floating-point numbers for the single form/double form and as integer/Parallel FP data for the integer form. The system converts each number into the floating-point register format. The value at the lowest address is placed in FR f1, and the value at the highest address is placed in FR f2. The fldtype completer again specifies special load operations, and the value of the ldhint modifier specifies the locality of the memory access. Again, where eight byte aligned but not 16 byte aligned, such a routine would benefit from the design presented herein.

It will be appreciated to those of skill in the art that the present design may be applied to other systems that perform computational functions, such as other high speed computation processes besides those present in the Itanium architecture. In particular, it will be appreciated that various types of bit field testing functions may be addressed by the functionality and associated aspects described herein.

Although there has been hereinabove described a method and for performing bit field testing for a typically sized bit fields, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A method for testing bit field contents contained in a source, the source comprising a full complement of source bits, the bit field comprising less than the full complement of source bits and having a size and position within the source, the method comprising:
   encoding the position and the size of the bit field into a reference field;
   creating a mask using the position and size in the reference field;
   performing a combined function, the combined function comprising shifting the position of the bit field to form a shifted result and employing the mask to select between the shifted result within the range of the bit field and uniform predetermined values, said employing forming a full width intermediate value, wherein bit positions outside the bit field are set to the uniform predetermined values; and
   combining all bits in the full width intermediate result to form a final result.

2. The method of claim 1, wherein said shifting comprises shifting bits in the bit field to a least significant shifter location.

3. The method of claim 1, wherein combining all bits in the full width intermediate result comprise performing one from a group of the following functions on the bits to provide the final result, the final result comprising an indication of whether the bit field contains a desired value:
   an OR function; and
   an AND function.

4. The method of claim 1, wherein the mask comprises a 64 bit mask, and wherein the method further comprises using the mask to drive a multiplexor.

5. The method of claim 4, wherein the multiplexor selects on a bit-by-bit basis one from a group comprising:
   the shifted result;
   zero; and
   one.

6. A method for testing bit field contents contained in a source, the source comprising a full complement of source bits, the bit field comprising less than the full complement of source bits, said method comprising:
   creating a mask, said creating comprising:
      setting bits in the mask positioned outside the bit field in the source to zero;
      setting bits in the mask positioned inside the bit field in the source to one; and
      encoding length of the bit field into the mask;
   applying the mask created to the source to form an intermediate result; and
   combining bits in the intermediate result to form a final result.

7. The method of claim 6, wherein the mask created comprises 64 bits, each bit corresponding to one bit in the source.

8. The method of claim 7, wherein the mask is employed to select at least one bit in the source.

9. The method of claim 7, where the mask is employed to select a fixed value.

10. The method of claim 6, wherein the mask comprises a 64 bit mask, and wherein the method further comprises using the mask created to drive a multiplexor.

11. The method of claim 10, wherein the multiplexor selects on a bit-by-bit basis one from a group comprising:
   the intermediate result;
   zero; and
   one.

12. The method of claim 10, wherein combining bits in the intermediate result to provide a final result comprises performing an AND function across the 64 bits received from the multiplexor.

13. The method of claim 10, wherein combining bits in the intermediate result to provide a final result comprises performing an OR function across the 64 bits received from the multiplexor.

14. A method for comparing bit field contents contained in a source comprising a full complement of source bits, the bit field comprising less than the full complement of source bits, comprising:
   creating a mask covering the bit field in the source;
   generating a comparison value, the comparison value comprising values to be tested against, the comparison value aligned with the bit field in the source;
   exclusively ORing the bit field with the comparison value to form an intermediate value having an intermediate bit field corresponding to the bit field in the source; and
   performing a combined function, the combined function applying the mask to the intermediate value to determine whether bits in the intermediate value corresponding to the masked bit field produce a uniform result.

15. The method of claim 14, where performing the combined function comprises applying the mask to the intermediate value to determine whether the bit field in the intermediate value produces all ones.

16. The method of claim 14, where performing the combined function comprises applying the mask to the intermediate value to determine whether the bit field in the intermediate value produces all zeros.

17. The method of claim 14, wherein the mask comprises ones across the bit field.

18. The method of claim 17, wherein the mask comprises ones across the bit field and zeros elsewhere.

19. The method of claim 14, wherein the method compares fields for equality to a nonuniform series of values.

20. A method for comparing bit field contents contained in a source comprising a full complement of source bits, the bit field comprising less than the full complement of source bits, comprising:
   creating a mask covering the bit field in the source;
   generating a comparison value, the comparison value comprising values to be tested against, the comparison value aligned with the bit field in the source; and
   performing a combined function, the combined function exclusively ORing the bit field with the comparison value to form an intermediate value, and ANDing the intermediate value with the mask to determine whether bits in the intermediate value corresponding to predetermined values in the mask are of a selected value.

21. The method of claim 20, where performing the combined function comprises combining the intermediate value with the mask to determine whether bits in the intermediate value corresponding to ones in the mask are ones.

22. The method of claim 20, where performing the combined function comprises combining the intermediate value with the mask to determine whether bits in the intermediate value corresponding to ones in the mask are zeros.

23. The method of claim 20, wherein the comparison value comprises a series of uniform values.

24. The method of claim 20, wherein the comparison value comprises a series of nonuniform values.

* * * * *